United States Patent
Imai et al.

(10) Patent No.: US 10,232,766 B2
(45) Date of Patent: Mar. 19, 2019

(54) DOOR HANDLE

(71) Applicants: KOITO MANUFACTURING CO., LTD., Tokyo (JP); TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Yuko Imai, Shizuoka (JP); Shigehiko Kazaoka, Shizuoka (JP); Masashi Hanazato, Toyota (JP); Nobukazu Araki, Hekinan-shi (JP); Masashi Tateishi, Nagoya (JP)

(73) Assignees: KOITO MANUFACTURING CO., LTD., Minato-ku, Tokyo (JP); TOYOTA JIDOSHA KABUSHIKI KAISHA, Aichi-ken (JP); AISIN SEIKI KABUSHIKI KAISHA, Aichi-ken (JP)

( * ) Notice: Subject to any disclaimer, the term of this patent is extended or adjusted under 35 U.S.C. 154(b) by 1 day.

(21) Appl. No.: 15/440,650

(22) Filed: Feb. 23, 2017

(65) Prior Publication Data
US 2017/0246986 A1  Aug. 31, 2017

(30) Foreign Application Priority Data

Feb. 26, 2016 (JP) ................................. 2016-035658

(51) Int. Cl.
| | |
|---|---|
| *B60Q 1/26* | (2006.01) |
| *F21V 8/00* | (2006.01) |
| *E05B 17/10* | (2006.01) |
| *E05B 85/16* | (2014.01) |
| *F21S 43/14* | (2018.01) |
| *F21S 43/19* | (2018.01) |

(Continued)

(52) U.S. Cl.
CPC ............ *B60Q 1/2669* (2013.01); *E05B 17/10* (2013.01); *E05B 85/16* (2013.01); *F21S 43/14* (2018.01);

(Continued)

(58) Field of Classification Search
CPC ........ B60Q 1/2669; B60Q 3/267; E05B 17/10
See application file for complete search history.

(56) References Cited

U.S. PATENT DOCUMENTS 7,607,809 B2 * 10/2009 Misawa ............... B60Q 1/2669
                                                        362/487
2005/0231364 A1  10/2005 Nitawaki et al.
(Continued)

FOREIGN PATENT DOCUMENTS

DE   102010050183 A1   6/2011
EP      0931698 A2     7/1999
(Continued)

OTHER PUBLICATIONS

Extended European Search Reported dated Jul. 27, 2017 by the European Patent Office in counterpart Application No. 17157355.3.

*Primary Examiner* — Alexander K Garlen
(74) *Attorney, Agent, or Firm* — Sughrue Mion, PLLC (57) ABSTRACT

A door handle includes a case including a placement space therein, and a light guide disposed in the placement space and configured to guide light emitted from a light source, the light guide including a light exiting surface from which the light is irradiated toward the outside of the case. An irradiation passage hole through which the light irradiated from the light exiting surface passes is formed in the case. When a tangent line which passes through an outer surface of a door panel on a travelling direction side of the light passing through the irradiation passage hole and a wall surface for forming the irradiation passage hole is defined as a connecting line and an assembly of the connecting lines at the entire circumference of the irradiation passage hole is defined as a connecting line assembly, the light exiting surface is located on the outside of the connecting line assembly.

6 Claims, 11 Drawing Sheets

(51) Int. Cl.
*F21V 23/00* (2015.01)
*F21V 31/00* (2006.01)
*F21S 43/237* (2018.01)
*F21S 43/243* (2018.01)
*F21S 43/247* (2018.01)

(52) U.S. Cl.
CPC ........... *F21S 43/195* (2018.01); *F21S 43/237* (2018.01); *F21S 43/243* (2018.01); *F21S 43/247* (2018.01); *F21V 23/002* (2013.01); *F21V 31/005* (2013.01); *G02B 6/0055* (2013.01); *B60Q 2400/40* (2013.01)

(56) References Cited

U.S. PATENT DOCUMENTS

| | | | |
|---|---|---|---|
| 2007/0024420 A1* | 2/2007 | Watanabe | B60Q 1/2669 340/5.72 |
| 2008/0290668 A1* | 11/2008 | Ieda | B60R 25/24 292/198 |
| 2011/0170305 A1 | 7/2011 | Tanaka et al. | |
| 2012/0127746 A1* | 5/2012 | Lee | B60Q 1/2669 362/501 |
| 2012/0170298 A1* | 7/2012 | Lennhoff | B60Q 1/2665 362/521 |
| 2013/0003404 A1 | 1/2013 | Hayashi | |
| 2013/0242581 A1 | 9/2013 | Ukai et al. | |

FOREIGN PATENT DOCUMENTS

| | | |
|---|---|---|
| EP | 1060948 A2 | 12/2000 |
| JP | 2005-282204 A | 10/2005 |
| JP | 2009-133133 A | 6/2009 |
| JP | 2010-522661 A | 7/2010 |
| JP | 2010-229797 A | 10/2010 |
| WO | 2008/120067 A2 | 10/2008 |
| WO | 2011/131393 A1 | 10/2011 |

* cited by examiner

DOOR HANDLE

CROSS-REFERENCE TO RELATED APPLICATION

The present application claims priority from Japanese Patent Application No. 2016-035658 filed on Feb. 26, 2016, the entire content of which is incorporated herein by reference.

BACKGROUND

Technical Field

The present invention relates to a door handle having a configuration of guiding light in a predetermined direction by a light guide and irradiating the light toward the outside.

Patent Document 1: Japanese Patent Laid-Open Publication No. 2010-229797

Patent Document 2: Japanese Patent Laid-Open Publication No. 2009-133133

Patent Document 3: Japanese Patent Application Publication No. 2010-522661

Patent Document 4: Japanese Patent Laid-Open Publication No. 2005-282204

Related Art

There is a door handle which is configured such that the light emitted from a light source is irradiated in a predetermined direction (e.g., see Patent Documents 1 to 4).

Patent Documents 1 and 2 disclose a technique of illuminating a space under feet by an illumination unit incorporated in a door handle when a door is opened and closed. As the space under feet is illuminated, it is possible to grasp the presence of puddles or the like when the door is opened and closed, thereby improving the convenience of occupants.

Patent Documents 3 and 4 also disclose a technique regarding an illumination unit (illumination device) incorporated in a door handle. In the door handle disclosed in Patent Documents 3 and 4, light is irradiated from a light source of the illumination unit toward a concave portion (i.e., the portion called a handle cup) of a door panel located on the inside of the door handle, thereby illuminating the handle cup. The portion of the illumination unit, on which the light source is disposed, protrudes from a case of the door handle to the handle cup side or is located on an end portion on the handle cup side.

As the handle cup is illuminated, the visibility of the door handle and its surroundings is enhanced when a door is opened and closed, thereby improving the convenience of occupants.

By the way, in the door handle disclosed in Patent Documents 3 and 4, the portion of the illumination unit, on which the light source is disposed, protrudes from the case of the door handle to the handle cup side or is located on the end portion on the handle cup side. Accordingly, the light emitting portion enters the field of view of a vehicle driver or a pedestrian when seeing the door handle, and thus, there is a possibility that the light irradiated from the light source becomes dazzling light.

SUMMARY

Exemplary embodiments of the invention provide a door handle which can suppress the occurrence of dazzling light.

A door handle according to an exemplary embodiment, comprises:

a case including a placement space therein; and a light guide disposed in the placement space and configured to guide light emitted from a light source, the light guide including a light exiting surface from which the light is irradiated toward the outside of the case, wherein an irradiation passage hole through which the light irradiated from the light exiting surface passes is formed in the case, and when a tangent line which passes through an outer surface of a door panel on a travelling direction side of the light passing through the irradiation passage hole and a wall surface for forming the irradiation passage hole is defined as a connecting line and an assembly of the connecting lines at the entire circumference of the irradiation passage hole is defined as a connecting line assembly, the light exiting surface is located on the outside of the connecting line assembly.

In this way, the light passing through the irradiation passage hole is irradiated from the light exiting surface located on the outside of the connecting line assembly.

The wall surface may be formed as a reflecting surface for reflecting the light irradiated from the light exiting surface.

In this way, a part of the light irradiated from the light exiting surface is reflected by the wall surface when the light passes through the irradiation passage hole.

A diameter of the irradiation passage hole may increase as going from the placement space side toward the outside.

In this way, the direction in which the light irradiated from the light exiting surface spreads and the direction in which the diameter of the irradiation passage hole increases are matched.

A door handle according to an exemplary embodiment, comprises:

a case including a placement space therein; and a light guide disposed in the placement space and configured to guide light emitted from a light source, the light guide including a light exiting surface from which the light is irradiated toward the outside of the case, wherein an irradiation passage hole through which the light irradiated from the light exiting surface passes is formed in the case, and when an opening end on an outer side of the irradiation passage hole is defined as an outer opening end, an opening end on the placement space side thereof is defined as an inner opening end, a straight line passing through an arbitrary point in the outer opening end and an arbitrary point in the inner opening end is defined as a connecting line, and an assembly of the connecting lines at the entire circumference of the irradiation passage hole is defined as a connecting line assembly, the light exiting surface is located on the outside of the connecting line assembly.

In this way, the light passing through the irradiation passage hole is irradiated from the light exiting surface located on the outside of the connecting line assembly.

The wall surface may be formed as a reflecting surface for reflecting the light irradiated from the light exiting surface.

In this way, a part of the light irradiated from the light exiting surface is reflected by the wall surface when the light passes through the irradiation passage hole.

A diameter of the irradiation passage hole may increase as going from the placement space side toward the outside.

In this way, the direction in which the light irradiated from the light exiting surface spreads and the direction in which the diameter of the irradiation passage hole increases are matched.

According to the present invention, the light passing through the irradiation passage hole is irradiated from the light exiting surface located on the outside of the connecting line assembly. Therefore, the light emitting portion hardly enters the field of view of a vehicle driver or a pedestrian when seeing the door handle. Consequently, it is possible to suppress the occurrence of dazzling light.

BRIEF DESCRIPTION OF THE DRAWINGS

FIG. 1 shows an embodiment of the present invention, together with FIGS. 2 to 11.

FIG. 3 is a schematic plan view showing the door handle or the like.

DETAILED DESCRIPTION

Hereinafter, an embodiment for carrying out a door handle according to the present invention will be described with reference to the accompanying drawings.

Figure 1:
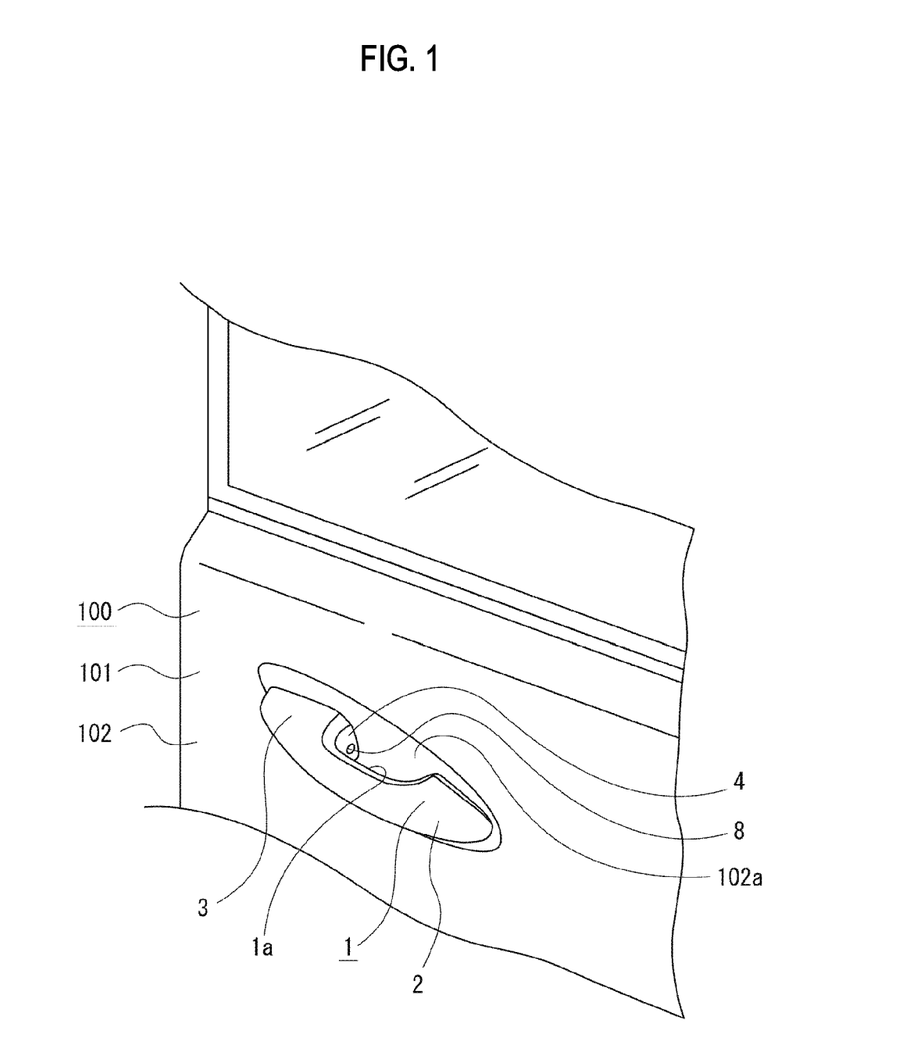
FIG. 1 is a schematic perspective view showing a state where a door handle is connected to a door.

A door handle 1 is, for example, formed in a shape extending substantially in a longitudinal direction and includes a case 2 and a lamp unit (to be described later) disposed in the interior of the case 2 (see FIGS. 1 to 3). The door handle 1 is used as a handle of a door 100 of a vehicle and also functions as an illuminator for illuminating each required position. The door handle 1 is connected to the door panel 101 in a pivotable state. A handle cup 102a is formed in an outer surface 102 of the door panel 101. The handle cup 102a functions as an insertion concave portion for allowing an operator (occupant) to insert his finger to the inside of the door handle 1.

The door handle 1 is adapted to be pivotable with respect to the door 100 such that it moves in a lateral direction of the vehicle with a front end portion as a pivot support point portion. The door handle 1 is pivoted by an operator in a direction away from the door panel 101 when the door 100 is opened. When the operation by the operator is ended, the door handle 1 is pivoted in a direction approaching to the door panel 101 by a biasing means (not shown) to return to its original position before the operation.

In the vehicle provided with such a door handle 1, when an operator holding a key for starting an engine of the vehicle approaches a certain distance from the door handle 1, the presence of the key is detected by a detection unit (not shown) incorporated in the door handle 1. At this time, light is irradiated from a lamp unit disposed on the inside of the door handle 1 with the detection of the presence of the key.

Since light is irradiated from the lamp unit toward the lower side of the door handle 1, and thus, the road surface under the feet is illuminated by the irradiated light, it is possible to grasp the presence of puddles or the like, for example, when the door 100 is opened and closed during night, thereby improving the convenience of occupants. Further, since light is also irradiated from the lamp unit toward the handle cup 102a, and thus, the handle cup 102a and its surroundings are illuminated by the irradiated light, the visibility of the door handle 1 is enhanced when the door 100 is opened and closed during night or the like, thereby improving the convenience of occupants.

The door handle 1 is formed with a grasping concave portion 1a at the portion excluding both front and rear end portions thereof. The grasping concave portion 1a is opened to the inner side, i.e., the door panel 101 side. The operator (occupant) inserts his finger into the grasping concave portion 1a to grasp and operate the door handle 1.

Figure 4:
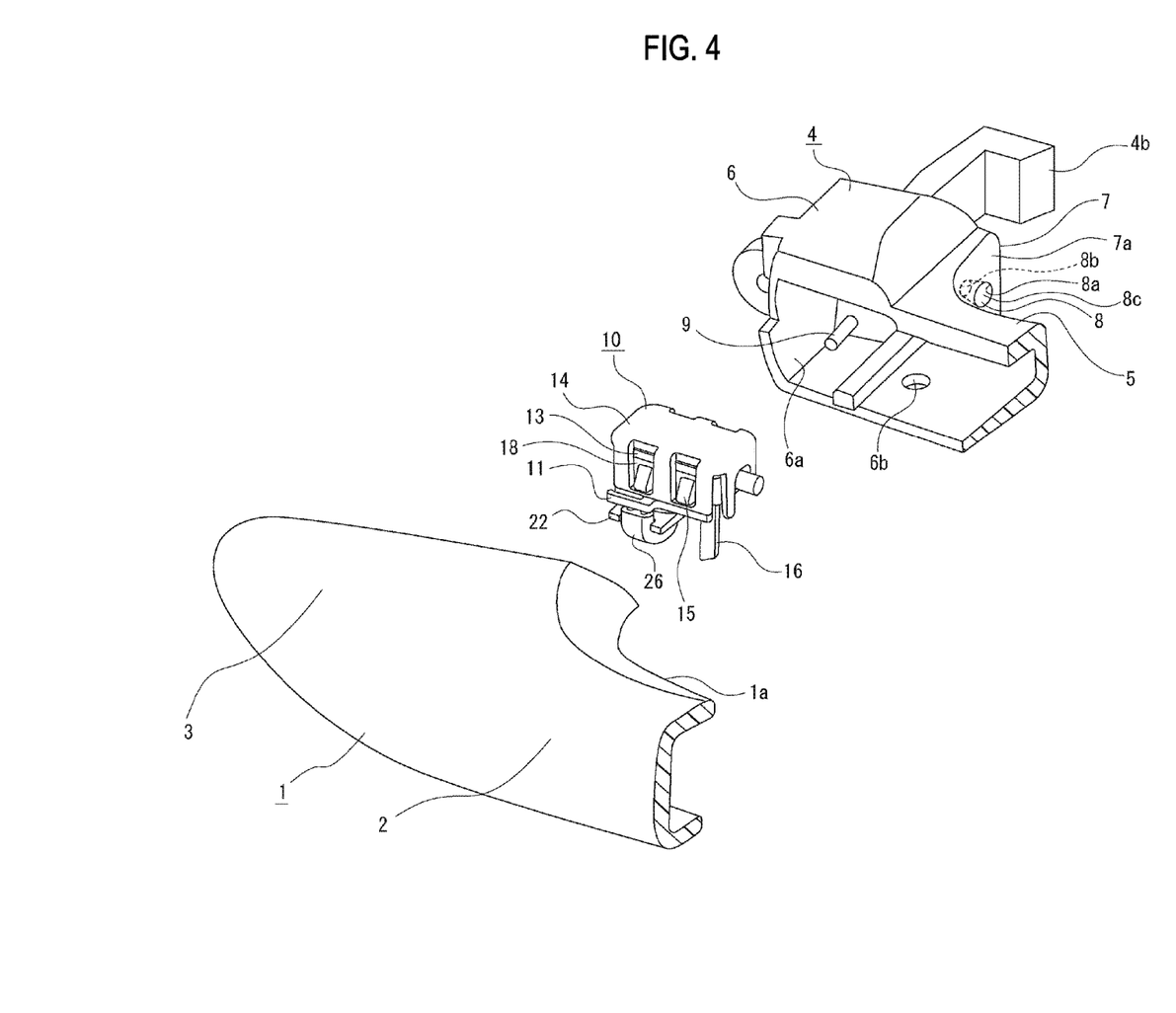
FIG. 4 is an exploded perspective view showing a lamp unit and a part of a case.
Figure 5:
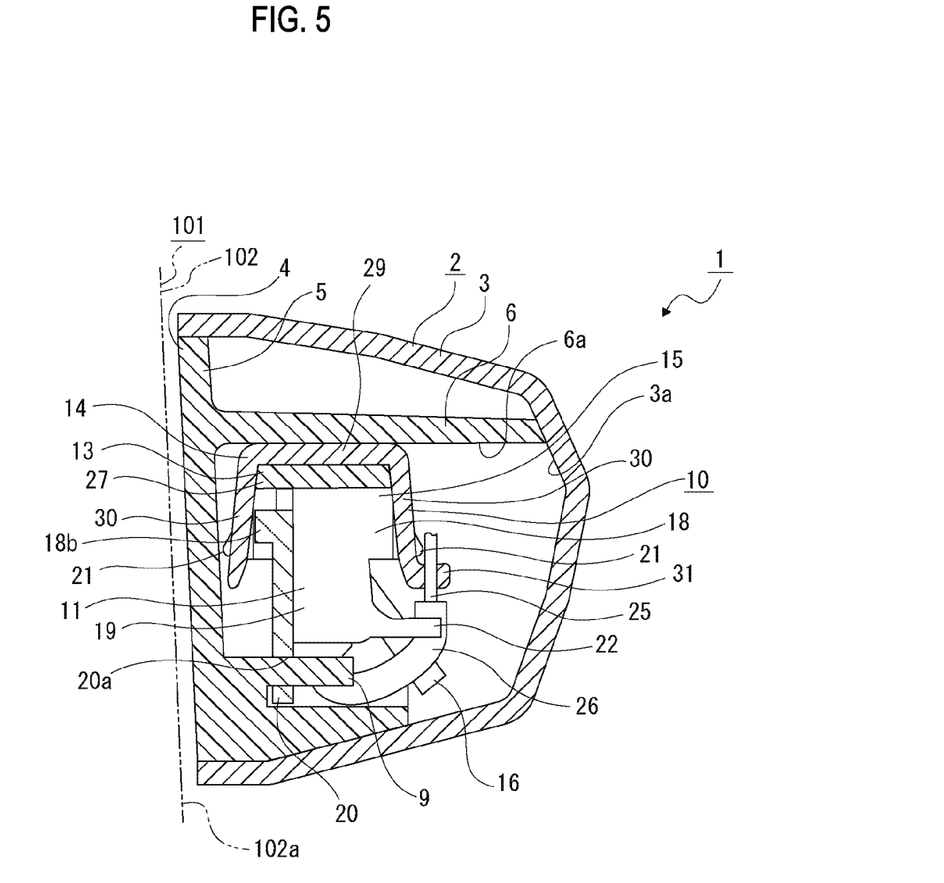
FIG. 5 is an enlarged sectional view taken along a line V-V shown in FIG. 3.
Figure 6:
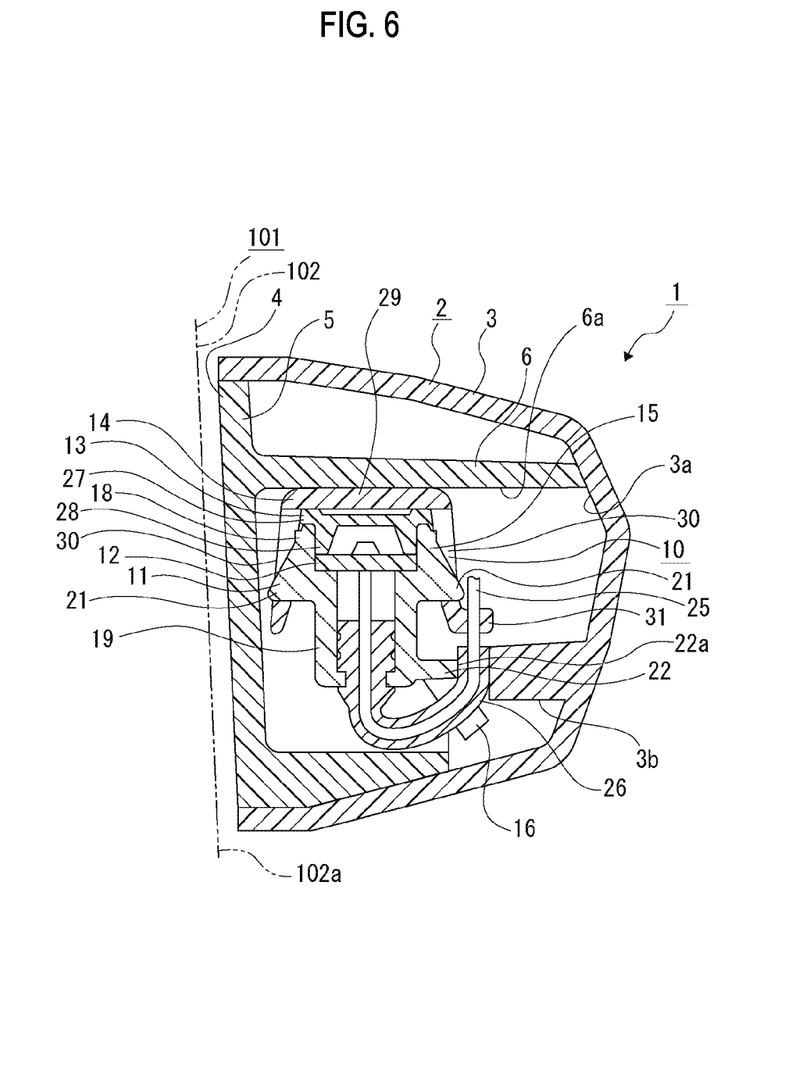
FIG. 6 is an enlarged sectional view taken along a line VI-VI shown in FIG. 3.

The case 2 includes an outer panel 3 and an inner panel 4 (see FIGS. 4 to 6). The outer panel 3 and the inner panel 4 are coupled in the lateral direction. The outer panel 3 is positioned on the outer side and the inner panel 4 is positioned on the inner side, i.e., on the door panel 101 side.

The outer panel 3 is formed in a shape which is substantially entirely opened to the inner side. An inner space of the outer panel 3 is formed as a placement concave portion 3a. A press protrusion 3b protruding to the inner panel 4 side is formed at a position close to the rear end of the outer panel 3 (see FIG. 6).

Figure 2:
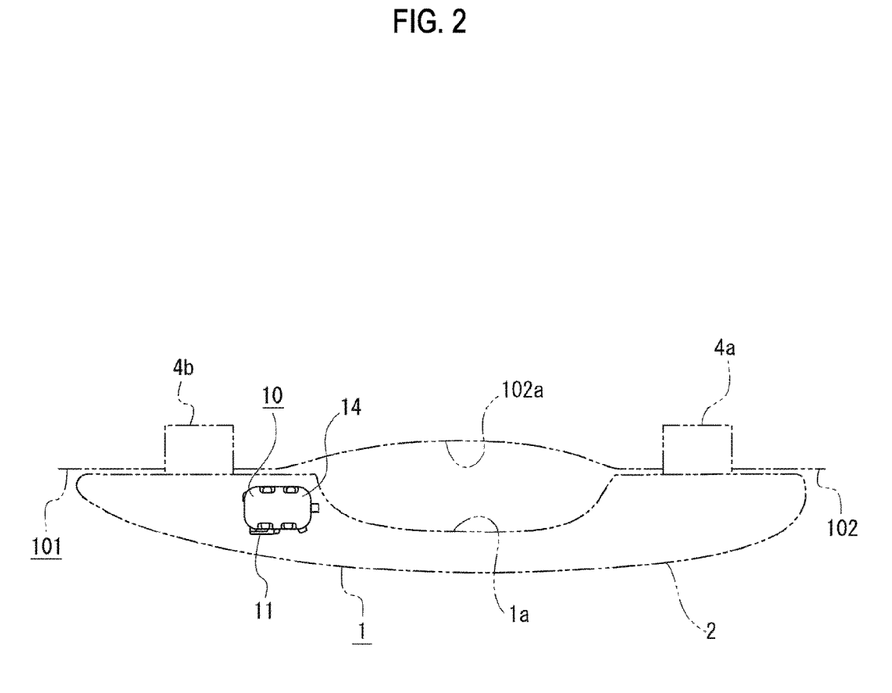
FIG. 2 is a schematic plan view of the door handle.
Figure 3:
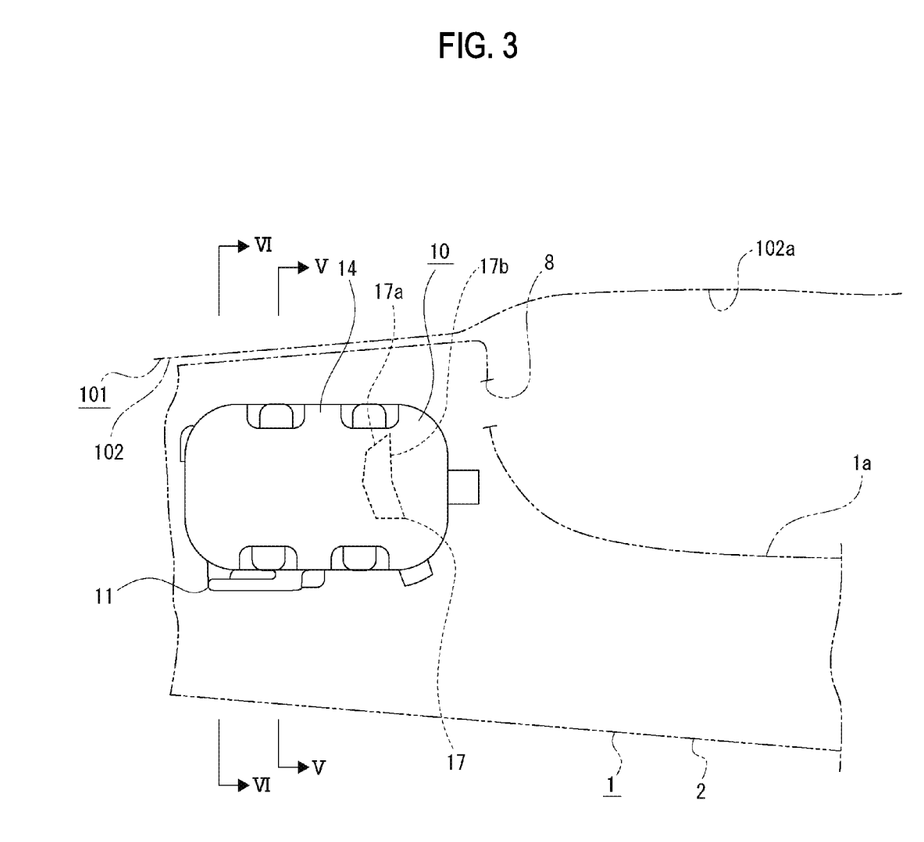

The inner panel 4 includes a coupling portion 5 extending in a longitudinal direction and connecting portions 4a, 4b each protruding to the side opposite to the outer panel 3 side from both front and rear ends of the coupling portion 5 (see FIGS. 2, 4). The connecting portions 4a, 4b are respectively inserted into the door panel 101, so that the inner panel 4 is respectively connected to each structural part provided on the inside of the door panel 101. The front connecting portion 4a functions as the above-described pivot support point portion relative to the door 100 of the door handle 1.

The coupling portion 5 is coupled to the outer panel 3 in a state of being, except for a part, inserted into the placement concave portion 3a of the outer panel 3 (see FIGS. 5 and 6).

A rear end portion of the coupling portion 5 is provided as a placement portion 6. In the placement portion 6, an end portion located on the door panel 101 side is provided as a protrusion portion 7 protruding to the door panel 101 side than the other portions of the coupling portion 5 (see FIG. 4). An irradiation passage hole 8 is formed in a front surface portion 7a of the protrusion portion 7 of the placement portion 6.

The irradiation passage hole 8 is configured such that an opening end on the outer side (front side) is formed as an outer opening end 8a and an opening end on the inner side (rear side) is formed as an inner opening end 8b. The irradiation passage hole 8 has, for example, a diameter increasing toward the front, so that a diameter of the outer opening end 8a is larger than that of the inner opening end 8b.

The placement portion 6 is formed in a shape opened to the outer panel 3 side and an inner space thereof is formed as a placement space 6a. A positioning shaft 9 protruding to the outer panel 3 side is provided in a rear end portion of the placement portion 6. The positioning shaft 9 is located in the placement space 6a.

A light transmission hole 6b penetrating in a vertical direction is formed in a lower end portion of the placement portion 6. The light transmission hole 6b is formed in the portion which is not inserted into the outer panel 3.

Figure 7:
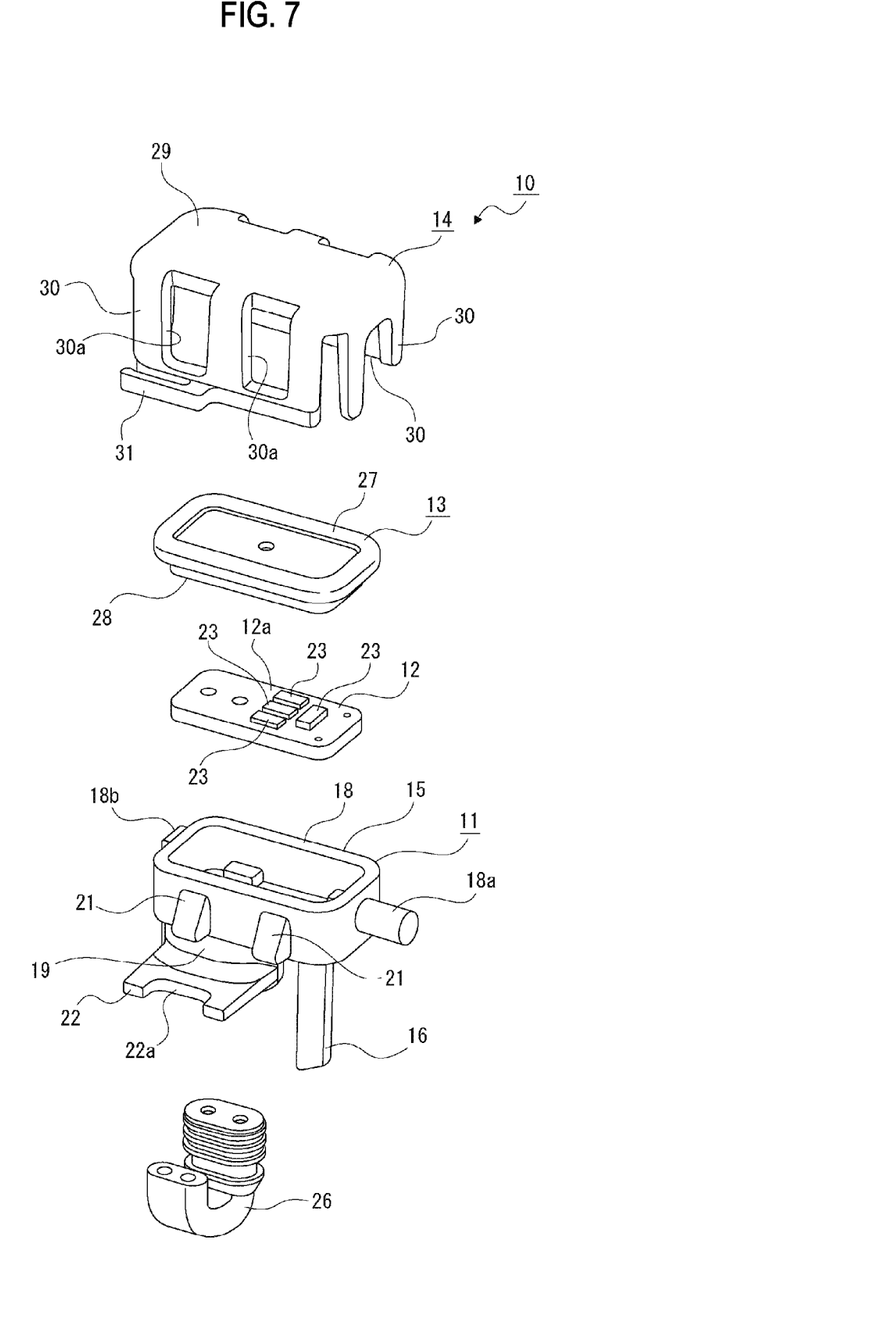
FIG. 7 is an exploded perspective view of the lamp unit.
Figure 8:
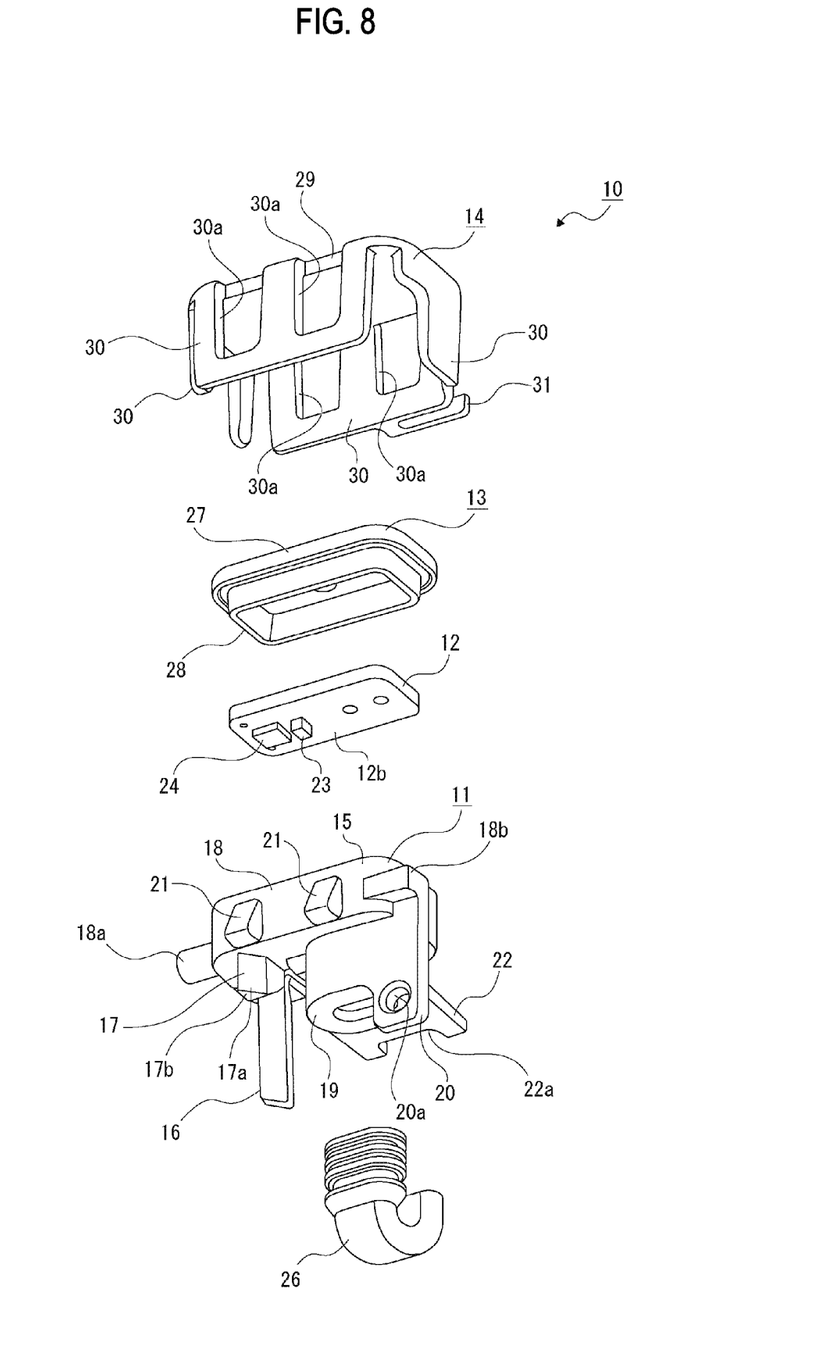
FIG. 8 is an exploded perspective view of the lamp unit shown in a state seen from the direction different from FIG. 7.
Figure 9:
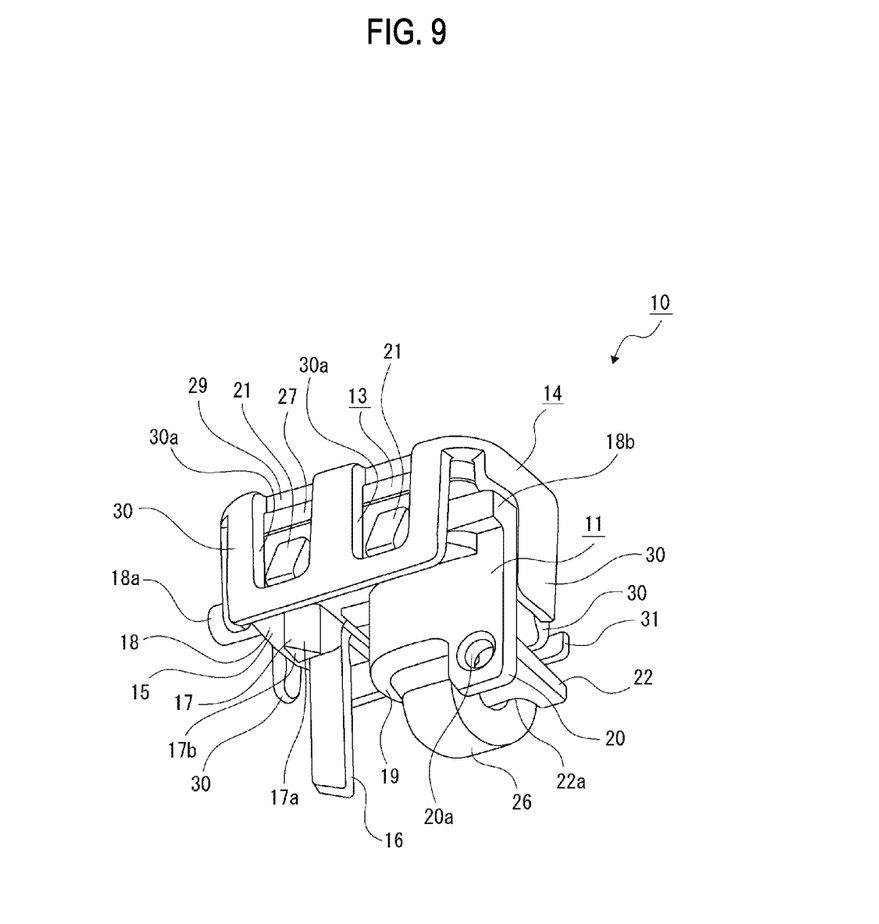
FIG. 9 is a perspective view of the lamp unit.

A lamp unit 10 is placed in the placement space 6a of the placement portion 6 (see FIGS. 4 to 6). The lamp unit 10 includes a composite structure 11 formed of transparent material, a circuit board 12 held on the composite structure 11, a gasket 13 attached to the composite structure 11, and a lid body 14 coupled to the composite structure 11 (see FIGS. 7 to 9).

The composite structure 11 is made by integrally forming a housing 15, a light guide portion 16 for the space under feet and a light guide 17 for a cup.

The housing 15 includes a substrate placement portion 18 formed in a box shape opened upward, a cord insertion portion 19 protruding downward from the substrate placement portion 18, a positioning protrusion portion 20 protruding downward from the cord insertion portion 19, coupling protrusion portions 21, 21, . . . provided at both left and right surfaces of the substrate placement portion 18, and a holding protrusion portion 22 protruding sideways from the cord insertion portion 19.

The substrate placement portion 18 has an internal shape which is the same as an external shape of the circuit board 12. The substrate placement portion 18 has a size larger than the circuit board 12. The substrate placement portion 18 is provided with a pressed shaft portion 18a protruding forward and a pressed protrusion portion 18b protruding rearward.

The cord insertion portion 19 is formed in a cylinder shape penetrating in the vertical direction and protrudes downward at a position on the rear side of a front end portion of the substrate placement portion 18.

The positioning protrusion portion 20 is formed with a positioning hole 20a penetrating in the lateral direction.

Two coupling protrusion portions 21, 21 are respectively provided on both left and right surfaces of the substrate placement portion 18 so as to be spaced apart from each other in the longitudinal direction.

The holding protrusion portion 22 is formed with a holding concave portion 22a opened sideways.

The light guide portion 16 for the space under feet protrudes downward obliquely from the portion on the front end side of the substrate placement portion 18. The light guide portion 16 for the space under feet is formed in a columnar shape.

The light guide portion 17 for the cup is located on the side of the light guide portion 16 for the space under feet. The light guide portion 17 for the cup serves as a light guide for guiding light downward and irradiating the guided light toward the front. The length in the vertical direction of the light guide portion 17 for the cup is shorter than that of the light guide portion 16 for the space under feet.

In the light guide portion 17 for the cup, a part of each surface is formed as a reflecting surface 17a for internally reflecting light and at least a part of a front surface is formed as a light exiting surface 17b for irradiating light.

The circuit board 12 has a plate shape oriented in the vertical direction and is formed as a double-sided board. Electronic components 23, 23, . . . are mounted on an upper surface 12a and a lower surface 12b of the circuit board 12, respectively. As the electronic components 23, 23, . . . , a diode having a rectification function, a resistor having a current limiting function, or a capacitor having an electric storage function or an electric discharge function, or the like is used.

A light source 24 for emitting light is mounted on a front half of the lower surface 12b of the circuit board 12. As the light source 24, for example, an LED (Light Emitting Diode) is used. The light source 24 is disposed in the state where its light emitting surface faces downward. Therefore, light is emitted downward from the light source 24.

Respective one ends of connection cords 25, 25 for supplying drive current to the light source 24 or the like are, by a soldering or the like, connected to a rear half of the circuit board 12 from the lower side (see FIG. 6). The connection cords 25, 25 are inserted through the inside of the case 2 and the other ends thereof are connected to a power supply circuit (not shown).

A bushing 26 is externally fitted to portions on one end side of the connection cords 25, 25, so that the connection cords 25, 25 are protected by the bushing 26. The bushing 26 is formed of rubber material or the like and is elastically deformable.

The circuit board 12 to which the connection cords 25, 25 are connected is inserted into the substrate placement portion 18 of the housing 15 from above and placed in the substrate placement portion 18.

In the state where the circuit board 12 is placed in the substrate placement portion 18, the gasket 13 is attached to the circuit board 12.

The gasket 13 is made by integrally forming a generally flat plate-shaped closing surface portion 27 oriented in the vertical direction and an annular pressing portion 28 protruding downward from the portion on the slightly inner side of an outer peripheral surface of the closing surface portion 27.

The gasket 13 is attached to the housing 15 in the state where the closing surface portion 27 is brought into close contact with an upper surface of the substrate placement portion 18 and the pressing portion 28 is fitted to the substrate placement portion 18. In the state where the gasket 13 is attached to the housing 15, an outer peripheral portion of the circuit board 12 is pressed from above by the pressing portion 28, so that the circuit board 12 is stably placed in the substrate placement portion 18 and the waterproofing of the circuit board 12 is achieved.

In the state where the gasket 13 is attached to the substrate placement portion 18, the lid body 14 is coupled to the housing 15. The lid body 14 has a generally flat plate-shaped covering surface portion 29 oriented in the vertical direction, peripheral surface portions 30, 30, . . . each protruding downward from an outer peripheral portion of the covering surface portion 29, and a cord pressing portion 31 provided continuously to a lower end portion of one peripheral surface portion 30 (see FIGS. 5 to 9).

Coupling holes 30a, 30a, . . . each penetrating in the lateral direction are formed in the peripheral surface portions 30, 30 located on the left and right. Two coupling holes 30a, 30a are respectively formed in the peripheral surface portions 30, 30 so as to be spaced apart from each other in the longitudinal direction.

The coupling protrusion portions 21, 21 are respectively locked to lower opening edges of the coupling holes 30a, 30a, . . . formed in the peripheral surface portions 30, 30, so that the lid body 14 is coupled to the housing 15.

In the state where the lid body 14 is coupled to the housing 15, the gasket 13 is closed from above by the covering surface portion 29.

The lamp unit 10 configured as described above is positioned in the case 2 and placed in the placement space 6a of the placement portion 6 in such a way that the positioning shaft 9 of the inner panel 4 is inserted into the positioning hole 20a formed in the positioning protrusion portion 20 of the housing 15, and the pressed shaft portion 18a and the pressed protrusion portion 18b are pressed by each portion of the inner panel 4 (see FIGS. 5 and 6).

In the state where the lamp unit 10 is positioned and placed in the placement space 6a as described above, a part of the connection cords 25, 25 and a part of the bushing 26 are inserted through the cord insertion portion 19 and the bushing 26 is attached to the cord insertion portion 19. The connection cords 25, 25 and the bushing 26 are bent so as to be folded back in the lateral direction. One end portion of the bushing 26 is pressed by the press protrusion 3b of the outer panel 3 in a state of being inserted into the holding concave portion 22a of the holding protrusion portion 22, and a part of the connection cords 25, 25 is held in the cord pressing portion 31.

Hereinafter, an irradiation state of light in the lamp unit 10 will be described.

When light is emitted downward from the light source 24 mounted on the circuit board 12, the emitted light is incident on the light guide portion 16 for the space under feet and the light guide portion 17 for the cup.

The light incident on the light guide portion 16 for the space under feet is guided by the light guide portion 16 for the space under feet and irradiated downward from the lower surface of the light guide portion 16 for the space under feet through the light transmission hole 6b of the placement portion 6. Therefore, the space under feet can be illuminated, and thus, it is possible to grasp the presence of puddles or the like when the door 100 is opened and closed, thereby improving the convenience of occupants.

On the other hand, the light incident on the light guide portion 17 for the cup is guided by the light guide portion 17 for the cup and internally reflected by the reflecting surface 17a, thereby being irradiated from the light exiting surface 17b. At this time, the light guided by the light guide portion 17 for the cup also includes a light which is incident on the light exiting surface 17b without reaching the reflecting surface 17a and is irradiated from the light exiting surface 17b.

The light irradiated from the light exiting surface 17b is directed to the handle cup 102a through the irradiation passage hole 8 formed in the protrusion portion 7 of the inner panel 4. Therefore, the handle cup 102a is illuminated, so that the visibility of the door handle 1 and its surroundings is enhanced when the door 100 is opened and closed, thereby improving the convenience of occupants.

In addition, the door handle 1 may be configured such that a wall surface 8c for forming the irradiation passage hole 8, i.e., a peripheral surface from the outer opening end 8a to the inner opening end 8b of the irradiation passage hole 8 is formed as a reflecting surface.

As the wall surface 8c is formed as the reflecting surface, a part of the light irradiated from the light exiting surface 17b is reflected by the wall surface 8c and directed to the handle cup 102a when the light passes through the irradiation passage hole 8. Therefore, the amount of light directed to the handle cup 102a is increased, so that it is possible to improve the irradiation brightness by effective utilization of light. Further, as the wall surface 8c is formed as the reflecting surface, the travelling direction of light or the amount of light directed to the handle cup 102a can be controlled by the shape, size or position of the wall surface 8c, thereby improving the degree of freedom regarding the control of light.

Further, in the door handle 1, as described above, the irradiation passage hole 8 is configured such that the diameter of the outer opening end 8a is larger than that of the inner opening end 8b. Accordingly, the diameter of the irradiation passage hole 8 increases as going from the inner opening end 8b to the outer opening end 8a.

When the diameter of the irradiation passage hole 8 increases as going from the inner opening end 8b to the outer opening end 8a in this way, the light irradiated from the light exiting surface 17b spreads as it travels in a travelling direction. Therefore, the direction in which the light spreads and the direction in which the diameter of the irradiation passage hole 8 increases are matched and a lot of light is directed to the handle cup 102a due to the fact that the reflection or absorption of light hardly occurs at the wall surface 8c. As a result, it is possible to effectively utilize the light emitted from the light source 24.

Next, the position of the light exiting surface 17b of the light guide portion 17 for the cup with respect to the irradiation passage hole 8 will be described (see FIGS. 10 and 11).

Figure 10:
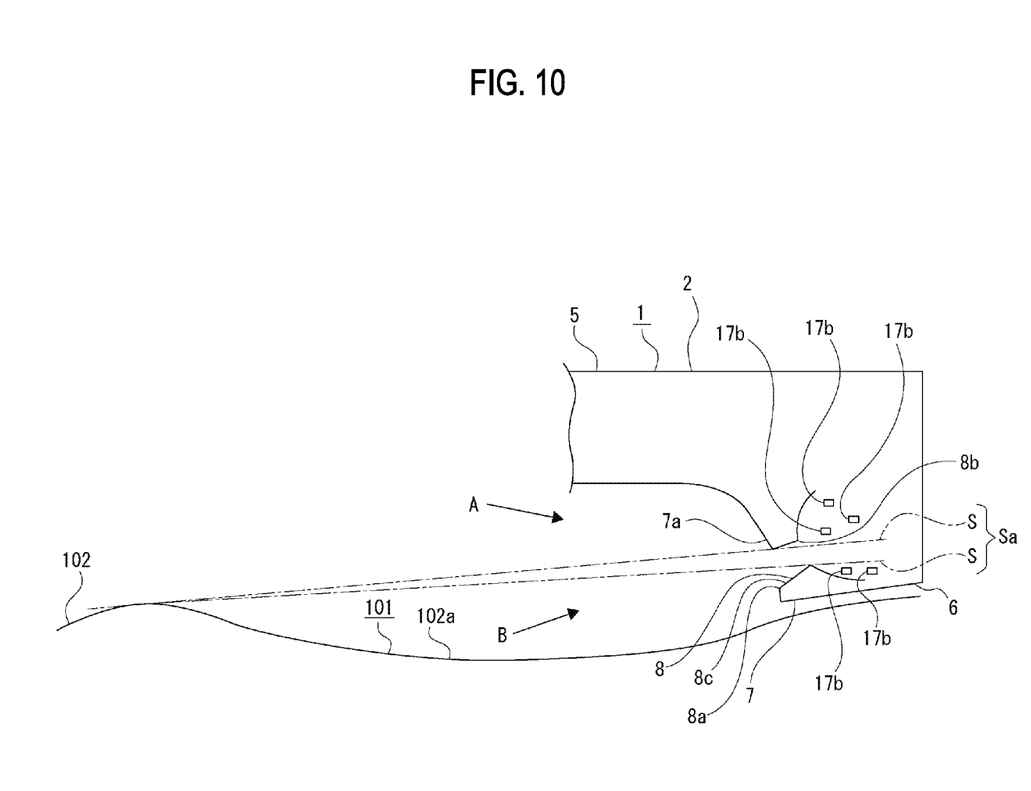
FIG. 10 is a conceptual view for explaining a position of a light exiting surface.
Figure 11:
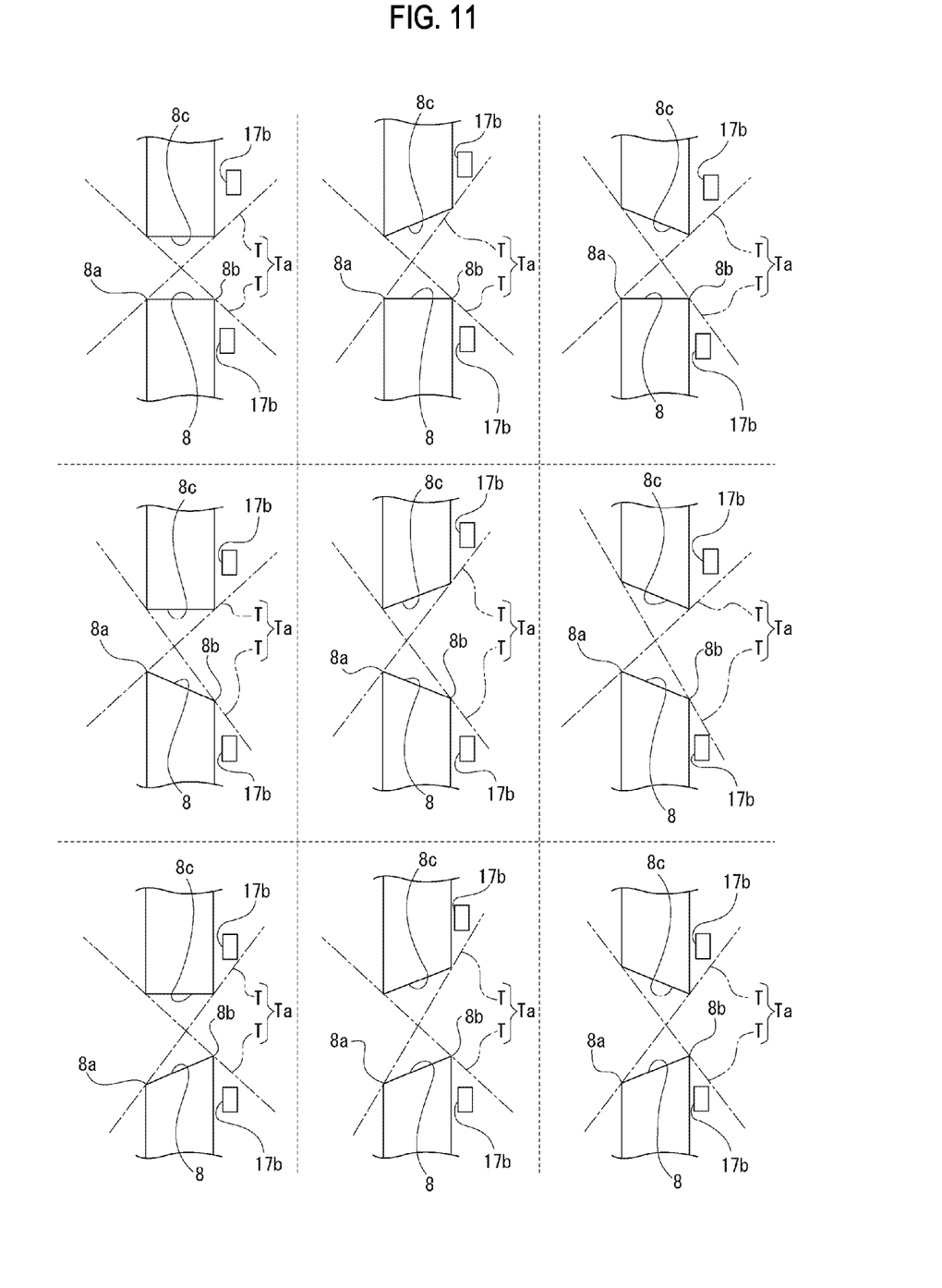
FIG. 11 is a conceptual view for explaining a more desirable position of the light exiting surface.

A tangent line which passes through the outer surface 102 of the door panel 101 on a travelling direction side (front side) of light passing through the irradiation passage hole 8 and the wall surface 8c for forming the irradiation passage hole 8 is defined as a connecting line S and an assembly of the connecting lines S, S, . . . at the entire circumference of the irradiation passage hole 8 is defined as a connecting line assembly Sa (see FIG. 10). At this time, the wall surface 8c is a surface including the outer opening end 8a and the inner opening end 8b of the irradiation passage hole 8.

When the assembly of the connecting lines S, S, . . . is defined as the connecting line assembly Sa in this manner, the light exiting surface 17b of the light guide portion 17 for the cup is located on the outside of the connecting line assembly Sa. Meanwhile, an example of the positions where the light exiting surfaces 17b, 17b, . . . can exist is conceptually shown in FIG. 10.

Since the light exiting surface 17b is located on the outside of the connecting line assembly Sa, the light exiting surface (light emitting portion) 17b located on the inside of the case 2 is hardly visible through the irradiation passage hole 8 when seeing the irradiation passage hole 8 from the front side. Accordingly, the light emitting portion hardly enters the field of view of a vehicle driver or a pedestrian.

However, in the case where the light exiting surface 17b is located on the outside of the connecting line assembly Sa, there is a possibility that the light exiting surface 17b located on the inside of the case 2 is visible when seeing the irradiation passage hole 8 from "A" direction or "B" direction shown in FIG. 10 or obliquely from above or obliquely from below.

Therefore, it is more desirable that the position of the light exiting surface 17b of the light guide portion 17 for the cup with respect to the irradiation passage hole 8 is set as follows (see FIG. 11).

A straight line passing through an arbitrary point in the outer opening end 8a and an arbitrary point in the inner opening end 8b is defined as a connecting line T, and an assembly of the connecting lines T, T, . . . at the entire circumference of the irradiation passage hole 8 is defined as a connecting line assembly Ta.

When the assembly of the connecting lines T, T, . . . is defined as the connecting line assembly Ta in this manner, the light exiting surface 17b of the light guide portion 17 for the cup is located on the outside of the connecting line assembly Ta. Meanwhile, respective examples of the irradiation passage hole 8 in which the direction of the wall surface 8c is different are shown in FIG. 11. In respective examples, the positions where the light exiting surfaces 17b, 17b, . . . can exist are conceptually shown.

Since the light exiting surface 17b is located on the outside of the connecting line assembly Ta, the light exiting surface 17b located on the inside of the case 2 is not visible through the irradiation passage hole 8 when seeing the irradiation passage hole 8 from the front or an oblique direction. Accordingly, the light emitting portion does not enter the field of view of a vehicle driver or a pedestrian.

As described above, in the door handle 1, the light exiting surface 17*b* is located on the outside of the connecting line assembly Sa. Therefore, the light passing through the irradiation passage hole 8 is irradiated from the light exiting surface 17*b* located on the outside of the connecting line assembly Sa, and thus, the light emitting portion hardly enters the field of view of a vehicle driver or a pedestrian when seeing the door handle 1. Consequently, it is possible to suppress the occurrence of dazzling light.

Further, since light is irradiated toward the handle cup 102*a* from the light exiting surface 17*b* which hardly enters the field of view, the light is hardly recognized as a so-called point light irradiation state where light is irradiated from one point. Consequently, it is possible to allow a vehicle occupant to recognize a uniform light irradiation state.

Further, when the light exiting surface 17*b* is located on the outside of the connecting line assembly Ta, the light passing through the irradiation passage hole 8 is irradiated from the light exiting surface 17*b* located on the outside of the connecting line assembly Ta. Therefore, the light emitting portion does not enter the field of view of a vehicle driver or a pedestrian when seeing the door handle 1. Consequently, it is possible to prevent the occurrence of dazzling light.

Further, since light is irradiated toward the handle cup 102*a* from the light exiting surface 17*b* which does not enter the field of view, the light is not recognized as a so-called point light irradiation state where light is irradiated from one point. Consequently, it is possible to allow a vehicle occupant to recognize a uniform light irradiation state.

What is claimed is:

1. A door handle comprising:
    a case pivotally attached to a vehicle door and adapted to be grasped by an operator to open and close the vehicle door, said case including a placement space therein; and
    a light guide disposed in the placement space and configured to guide light emitted from a light source, the light guide including a light exiting surface from which the light is irradiated toward the outside of the case,
    wherein an irradiation passage hole through which the light irradiated from the light exiting surface passes is formed in the case, and
    when a tangent line which passes through a portion bulging outward facing the irradiation passage hole on an outer surface of a door panel of the vehicle door and a wall surface for forming the irradiation passage hole is defined as a connecting line and an assembly of the connecting lines at the entire circumference of the irradiation passage hole is defined as a connecting line assembly, the light exiting surface is located on the outside of the connecting line assembly.

2. The door handle according to claim 1, wherein the wall surface is formed as a reflecting surface for reflecting the light irradiated from the light exiting surface.

3. The door handle according to claim 1, wherein a diameter of the irradiation passage hole increases as going from the placement space side toward the outside.

4. A door handle comprising:
    a case pivotally attached to a vehicle door and adapted to be grasped by an operator to open and close the vehicle door, said case including a placement space therein; and
    a light guide disposed in the placement space and configured to guide light emitted from a light source, the light guide including a light exiting surface from which the light is irradiated toward the outside of the case,
    wherein an irradiation passage hole through which the light irradiated from the light exiting surface passes is formed in the case, and
    when an opening end on an outer side of the irradiation passage hole is defined as an outer opening end, an opening end on the placement space side thereof is defined as an inner opening end, a straight line passing through an arbitrary point in the outer opening end and an arbitrary point in the inner opening end is defined as a connecting line, and an assembly of the connecting lines at the entire circumference of the irradiation passage hole is defined as a connecting line assembly, the light exiting surface is located on the outside of the connecting line assembly.

5. The door handle according to claim 4, wherein a wall surface which forms the irradiation passage hole is formed as a reflecting surface for reflecting the light irradiated from the light exiting surface.

6. The door handle according to claim 4, wherein a diameter of the irradiation passage hole increases as going from the placement space side toward the outside.

* * * * *